United States Patent
Riedinger et al.

(10) Patent No.: US 12,495,022 B2
(45) Date of Patent: Dec. 9, 2025

(54) APPARATUS, METHOD, AND COMPUTER PROGRAM FOR THE SECURE, HIGH-AVAILABILITY TRANSMISSION OF MESSAGES, AND A VEHICLE COMPRISING THE APPARATUS

(71) Applicant: Robert Bosch GmbH, Stuttgart (DE)

(72) Inventors: Andreas Riedinger, Freiburg (DE); Reinhard Grossheim, Abtsgmuend (DE); Nicolas Huebner, Frankfurt am Main (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 18/340,497

(22) Filed: Jun. 23, 2023

(65) Prior Publication Data
US 2024/0007450 A1    Jan. 4, 2024

(30) Foreign Application Priority Data
Jul. 4, 2022    (DE) .............. 10 2022 206 796.7

(51) Int. Cl.
*B62D 5/00*    (2006.01)
*H04L 9/40*    (2022.01)

(52) U.S. Cl.
CPC .......... *H04L 63/0485* (2013.01); *B62D 5/003* (2013.01)

(58) Field of Classification Search
CPC . H04L 63/0485; H04L 69/16; H04L 69/3226; H04L 12/40; B62D 5/003; B60R 16/0231; B60T 2260/02; B60T 2270/402; B60T 8/885; B60W 50/029
See application file for complete search history.

(56) References Cited

U.S. PATENT DOCUMENTS

| | | | |
|---|---|---|---|
| 6,757,774 B1 * | 6/2004 | Benson | G06F 1/263 710/305 |
| 10,791,125 B2 * | 9/2020 | Mohammed | G06F 21/606 |
| 10,991,175 B2 * | 4/2021 | Zhang | H04L 63/062 |

(Continued)

FOREIGN PATENT DOCUMENTS

| | | | | |
|---|---|---|---|---|
| CA | 2979653 A1 * | 3/2018 | ......... H04L 63/0428 |
| CN | 101399673 A * | 4/2009 | |

(Continued)

OTHER PUBLICATIONS

Lin et al. AnchorCAN: Anchor-based Secure CAN Communications System, 2018, IEEE. (Year: 2018).*

*Primary Examiner* — Lynn D Feild
*Assistant Examiner* — Abdullah Almamun
(74) *Attorney, Agent, or Firm* — Maginot, Moore & Beck LLP

(57) ABSTRACT

A method for secure, high-availability transmission of messages includes communicating a transmission of messages on a first channel secured using a message authentication code on a redundant private databus. The redundant private data bus is configured to connect a first control unit and a second control unit. The method further includes communicating a transmission of messages on a second channel without protection using the message authentication code on the redundant private databus. The messages transmit signals. Signals from the first channel are used in a first operating state, and signals from the second channel are used in a second operating state.

12 Claims, 2 Drawing Sheets

(56) References Cited

U.S. PATENT DOCUMENTS

| | | | | |
|---|---|---|---|---|
| 2009/0169007 | A1* | 7/2009 | Vasicheck | E02F 9/205 |
| | | | | 380/255 |
| 2018/0270052 | A1* | 9/2018 | Cullen | H04L 9/0827 |
| 2018/0349235 | A1* | 12/2018 | Freydel | G06F 11/182 |
| 2019/0132780 | A1* | 5/2019 | Hahn | H04W 36/302 |
| 2020/0092129 | A1* | 3/2020 | Lin | H04L 12/4625 |
| 2021/0301734 | A1* | 9/2021 | Hart | G06F 11/0739 |
| 2022/0166292 | A1* | 5/2022 | Leiter | B62D 5/0484 |
| 2022/0179636 | A1* | 6/2022 | Barry | B60R 16/023 |
| 2022/0242367 | A1* | 8/2022 | Kato | G07C 9/00309 |

FOREIGN PATENT DOCUMENTS

| | | | | |
|---|---|---|---|---|
| CN | 108965218 A | * | 12/2018 | H04L 12/40 |
| CN | 110943957 A | * | 3/2020 | H04L 63/0428 |

* cited by examiner

APPARATUS, METHOD, AND COMPUTER PROGRAM FOR THE SECURE, HIGH-AVAILABILITY TRANSMISSION OF MESSAGES, AND A VEHICLE COMPRISING THE APPARATUS

This application claims priority under 35 U.S.C. § 119 to patent application no. DE 10 2022 206 796.7, filed on Jul. 4, 2022 in Germany, the disclosure of which is incorporated herein by reference in its entirety.

BACKGROUND

The disclosure is based on an apparatus, a method, and a computer program for the secure, high-availability transmission of messages, and a vehicle comprising the apparatus.

A vehicle comprises control units that evaluate data from various sensors and control a variety of actuators. Sensor data must be transmitted very reliably and at a very high frequency, e.g. at 1 kHz. Latencies in the millisecond range lead to a deterioration of a function, e.g. a steering feel, and can result in a loss of control, e.g. over a steering of the vehicle.

Private databuses are known for communication using control units having such requirements. Said units can feature multiple redundant channels for transmitting the same signals. These channels are secured against attacks using a message authentication code. For example, a message authentication code (MAC), e.g., AES CMAC as defined in NIST Special Publication 800-38B is used.

For example, if a date secured using the message authentication code is found to have a data integrity or data authenticity violation, it will not be used. This increases security on the one hand, but also bandwidth on the databus, since all redundantly transmitted instances of the datum are secured using the message authentication code.

SUMMARY

It is desirable to achieve a solution for the conflicting goals of the high availability of manipulated variables and sensor data and integrity and the authenticity of manipulated variables and sensor data.

This is achieved by means of the method, apparatus, vehicle, and computer program disclosed herein.

The method for the secure, high-availability transmission of messages, in particular in a steer-by-wire steering system of a vehicle, provides that, on a preferably redundant private databus connecting a first control unit, in particular a control unit of a control element, preferably a steering wheel actuator, and a second control unit, in particular a control unit of a drive, preferably a rack and pinion drive, a means of communication is provided for communicating the transmission of messages on a first channel secured using a message authentication code in particular, wherein communication for the transmission of messages on a second channel is performed without protection using the message authentication code, wherein the messages transmit signals, wherein signals from the first channel are used in a first operating state, and wherein signals from the second channel are used in a second operating state.

The connection of, e.g., control units involved in a vehicle traversal is achieved by a private databus, whereby none of the bus participants has direct connectivity to public networks. This private bus is regarded as a secure zone. Communication on the first channel is secured with regard to integrity/authenticity using MACs. Communication on the second channel is not additionally secured using MACs. This two-channel data transmission is used in such a way that only the first channel is secured with regard to integrity/authenticity. This results in the fact that only data of the first channel can be used in the first operating state (normal operation). The second channel then merely represents a fallback level for a particularly limited period of time if the availability of the first channel should be restricted. The following benefits are provided thereby:

The bus load on the second channel is reduced.

Software/hardware components used for integrity/authenticity testing need not be qualified according to requirements of the Automotive Safety Integrity Level classification level ASIL D.

A physical attack cannot be ruled out in the second operating state. However, the damage scenario is very manageable, since such an attack is to be considered misuse and the benefit seems small due to the limitation of the time period. The residual risk that arises must nevertheless be recognized and accepted.

A time period for an operation in the second operating state is or will be preferably limited. This operating state is limited in time, which reduces the risk of a successful attack.

Preferably, it is provided that the signals from the second channel are used when an error is detected, in particular an error that is intentionally caused or occurs accidentally, as a result of which no signals from the first channel are available. In the first operating state (normal operation) only signals whose integrity/authenticity can be verified via valid MACs are used. If no signals whose integrity/authenticity can be verified via valid MACs are available due to a deliberately caused or random error, then unsecured signals of the second channel are used to fulfill an availability request.

Preferably, the error is reported, in particular to a central control unit of the vehicle, with a response to the error being coordinated by the central control unit.

It can be provided that a data packet of a message being sent is secured using a security key by means of the message authentication code, whereby data packet is sent, and the data packet is verified using the key. These keys can be injected into the first control unit and/or the second control unit during production or generated at runtime based on a shared master secret.

It can be provided that multiple data packets for the transmission of the message are secured together with the key. This is particularly advantageous in order to conserve computing capacity on the control units involved, but also to reduce the bus load.

It can be provided that, on the private databus, communication on at least one further channel for the transmission of messages is secured using the message authentication code.

The apparatus for the secure, high-availability transmission of messages, in particular in a steer-by-wire steering system of a vehicle, provides that the apparatus comprises a preferably redundant private databus, a first control unit, in particular a control unit of an operating element, preferably a steering wheel actuator, and a second control unit, in particular a control unit of a drive, preferably a rack and pinion drive, in which case the databus connects the first control unit and the second control unit for the purpose of communication, said apparatus being designed to perform the method. This apparatus has advantages corresponding to the advantages of the method.

The vehicle comprises the apparatus and has advantages corresponding to the advantages of the apparatus.

A computer program comprising computer-readable instructions which, when executed by a computer, performs the method. This computer program has advantages corresponding to the advantages of the method.

BRIEF DESCRIPTION OF THE DRAWINGS

Further advantageous embodiments can be gathered from the following description and the drawings. Shown in the drawings are.

DETAILED DESCRIPTION

Figure 1:
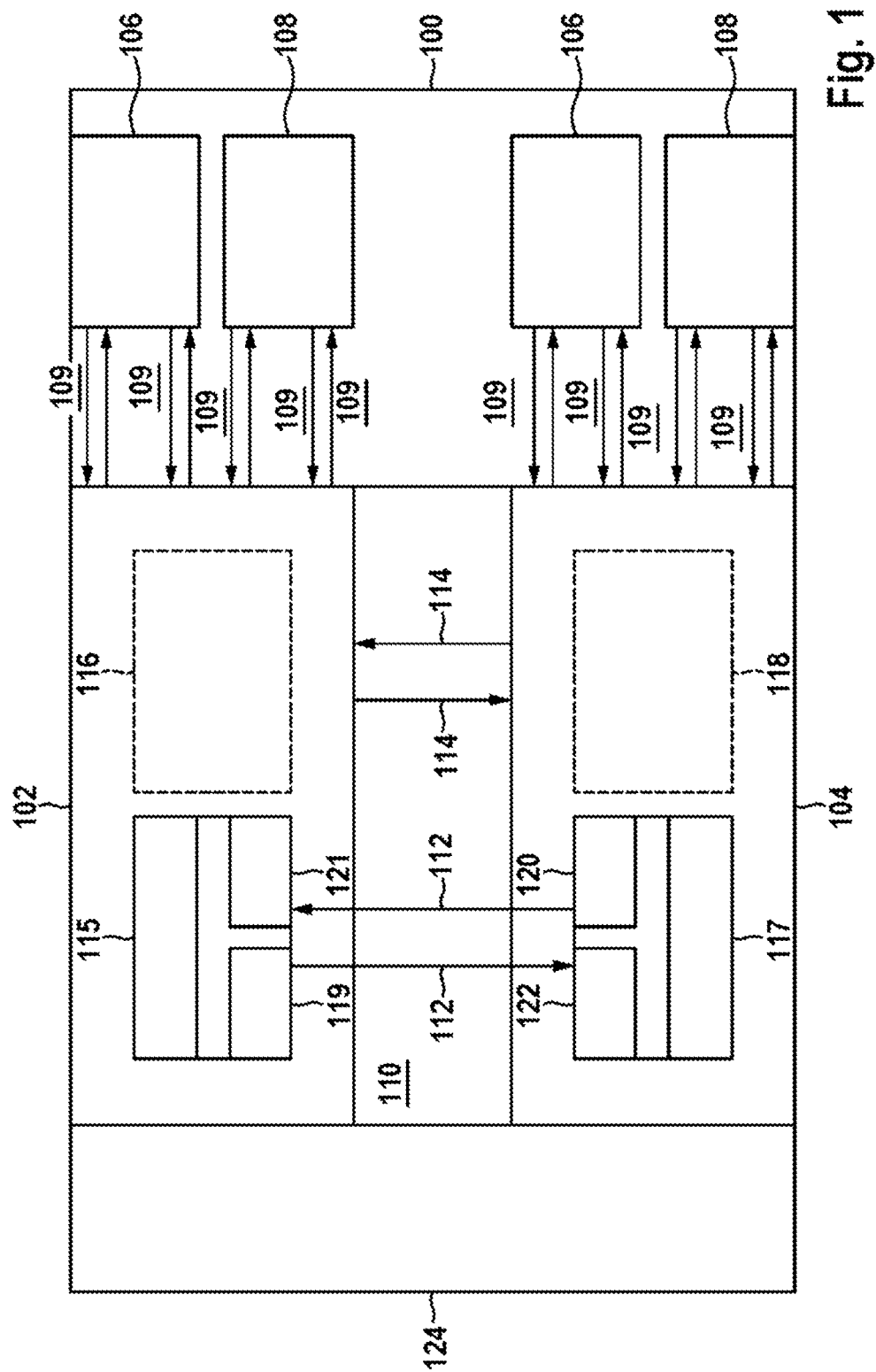
FIG. 1 a schematic representation of a vehicle having an apparatus for the secure, high-availability transmission of messages, and FIG. 2 steps in a method for the secure, high-availability transmission of messages.
Figure 2:
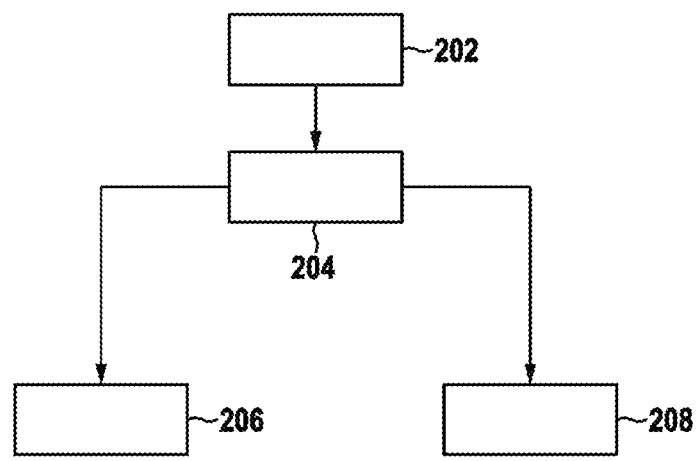

FIG. 1 schematically illustrates a vehicle 100 comprising an apparatus for the secure, high-availability transmission of messages.

The apparatus is described in the example of the secure, high-availability transmission of messages in a steer-by-wire steering system of the vehicle 100.

The apparatus comprises a first control unit 102 and a second control unit 104.

In the example, the first control unit 102 is a control unit of a control element, preferably a steering wheel actuator. In the example, the second control unit 104 is a control unit of a drive, preferably a rack and pinion drive.

The vehicle 100 comprises at least one sensor 106 and at least one actuator 108.

One sensor 106 and one actuator 108 each are connected to one of the control units for the purpose of communication, in particular via a respective data connection 109.

In the example, the control element comprises one of the sensors 106 and one of the actuators 108 (in the example, associated with the first control unit 102).

In the example, the actuator comprises one of the sensors 106 and one of the actuators 108 (in the example, associated with the second control unit 104).

The apparatus comprises a preferably redundant private databus 110. The databus 110 connects the first control unit 102 and the second control unit 104 for the purpose of communication.

The databus 110 comprises a first channel 112. In the example, the first channel 112 is a bidirectional channel. The first channel 112 can also be unidirectional.

The databus 110 comprises a second channel 114. In the example, the second channel 114 is a bidirectional channel. The second channel 114 can also be unidirectional.

The first control unit 102 comprises a first primary computing device 115 and a first secondary computing device 116.

The second control unit 104 comprises a second primary computing device 117 and a second secondary computing device 118.

The first primary computing device 115 comprises a first device 119 for determining a message secured using a message authentication code for transmitting a signal.

The second primary computing device 117 comprises a second device 120 for determining a message secured using the message authentication code for transmitting a signal.

The first primary computing device 115 comprises a first device 121 for verifying a message secured using the message authentication code for transmitting a signal.

The second primary computing device 117 comprises a second device 122 for verifying a message secured using the message authentication code for transmitting a signal.

In the example, the primary computing devices are designed to communicate over the first channel 112, with the messages being transmitted in a secured manner using the message authentication code. In the example, the secondary computing devices are designed to communicate over the second channel 114, with the messages being transmitted without protection using the message authentication code.

In the example, the control units are further designed to communicate via a public databus 124.

The apparatus is designed to perform a method described hereinafter.

A computer program comprises computer-readable instructions which, when executed by a computer, e.g. the computing devices, cause the method to be performed.

The method is used for the secure, high-availability transmission of messages, especially in a steer-by-wire steering system of a vehicle 100.

The method comprises a step 202.

In step 202, the messages are transmitted with the signals, in particular by at least one of the sensors 106 or at least one of the actuators 108 of the vehicle 100.

A means of communication for transmitting the messages is secured on the first channel 112 using the message authentication code in particular.

A means of communication for transmitting messages on a second channel 114 is performed without securing using the message authentication code.

For example, a data packet of a message being sent is secured using a key for securing with the message authentication code, in which case the data packet is sent, and the data packet is verified using the key.

It can be provided that multiple data packets for the transmission of the message are secured together with the key.

A means of communications can be provided on the private databus 110 on at least one additional channel for transmitting messages secured using the message authentication code.

The method comprises a step 204.

In step 204, a check is made to determine whether an error is detected, in particular an error that is intentional or accidental, due to which no signals are available from the first channel 112.

If there is no error, then step 206 is performed. Otherwise, step 208 is performed.

In step 206, signals from the first channel 112 are used in a first operational state. These signals are secured with regard to the lower integrity/authenticity use of MACs.

In step 208, signals from the second channel 114 are used in a second operating state. These signals are not additionally secured using MACs.

If a means of communication is secured on the private databus 110 on at least one further channel for transmitting messages using the message authentication code, then provision can be made to first use these instead of the signals from the second channel 114.

In one embodiment, a time period for an operation in the second operating state is or will be limited.

In one embodiment, the error is reported, in particular to a central control unit of the vehicle 100.

It can be provided that a response to the error is coordinated by the central control unit.

What is claimed is:

1. A method for secure, high-availability transmission of messages, the method comprising:
   transmitting messages on a first channel secured using a message authentication code on a redundant private databus, the messages on the first channel including signals, the redundant private data bus configured to connect a first control unit and a second control unit;
   transmitting messages on a second channel without protection using the message authentication code on the redundant private databus, the messages on the second channel including the signals;
   using, in a first operating state, the signals from the first channel to perform an operation; and
   using, in a second operating state, the signals from the second channel to perform the operation for a limited time period, the using of the signals from the second channel to perform the operation being stopped after the limited time period has expired.

2. The method according to claim 1, further comprising:
   using the signals from the second channel when an error is detected, due to which error no signals from the first channel are available.

3. The method according to claim 2, further comprising:
   reporting the error to a central control unit of a vehicle; and
   coordinating a response to the error by the central control unit.

4. The method according to claim 1, further comprising:
   sending a data packet of a message, the data packet being secured using a key for securing with the message authentication code; and
   verifying the data packet using the key.

5. The method according to claim 4, further comprising:
   securing together multiple data packets for transmission of the message together with the key.

6. The method according to claim 1, further comprising:
   communicating a transmission of messages on the redundant private databus on at least one further channel using the message authentication code.

7. The method according to claim 1, wherein a computer program comprises computer-readable instructions which, when executed by a computer, cause the method to be performed by the computer.

8. The method according to claim 1, wherein the method is for a steer-by-wire steering system of a vehicle.

9. The method according to claim 8, wherein:
   the first control unit is operably connected to a steering wheel actuator of the vehicle, and
   the second control unit is operably connected to a drive of a rack and pinion steering system of the vehicle.

10. The method according to claim 1, wherein the signals are transmitted from a sensor or an actuator of a vehicle.

11. An apparatus for secure, high-availability transmission of messages, comprising:
    a first control unit;
    a second control unit; and
    a redundant private databus configured to connect the first control unit and the second control unit for communication,
    wherein the apparatus is configured to (i) transmit messages on a first channel secured using a message authentication code on the redundant private databus, the messages on the first channel including signals, and (ii) transmit messages on a second channel without protection using the message authentication code on the redundant private databus, the messages on the second channel including the signals,
    wherein the signals from the first channel are used to perform an operation in a first operating state, and
    wherein the signals from the second channel are used to perform the operation in a second operating state for a limited time period, the use of the signals from the second channel to perform the operation being stopped after the limited time period has expired.

12. A vehicle, comprising:
    an apparatus for secure, high-availability transmission of messages, including (i) a first control unit, (ii) a second control unit, and (iii) a redundant private databus configured to connect the first control unit and the second control unit for communication,
    wherein the apparatus is configured to (i) transmit messages on a first channel secured using a message authentication code on the redundant private databus, the messages on the first channel including signals, and (ii) transmit messages on a second channel without protection using the message authentication code on the redundant private databus, the messages on the second channel including the signals,
    wherein the signals from the first channel are used to perform an operation in a first operating state, and
    wherein the signals from the second channel are used to perform the operation in a second operating state for a limited time period, the use of the signals from the second channel to perform the operation being stopped after the limited time period has expired.

* * * * *